(12) United States Patent
Nicholls et al.

(10) Patent No.: US 10,803,201 B1
(45) Date of Patent: Oct. 13, 2020

(54) SYSTEM AND METHOD FOR LOCAL THRESHOLDING OF RE-IDENTIFICATION RISK MEASUREMENT AND MITIGATION

(71) Applicant: PRIVACY ANALYTICS INC., Ottawa (CA)

(72) Inventors: Hazel Joyce Nicholls, Ottawa (CA); Andrew Richard Baker, Ottawa (CA); Yasser Jafer, Ottawa (CA); Martin Scaiano, Ottawa (CA)

(73) Assignee: PRIVACY ANALYTICS INC., Ottawa (CA)

( * ) Notice: Subject to any disclaimer, the term of this patent is extended or adjusted under 35 U.S.C. 154(b) by 307 days.

(21) Appl. No.: 15/904,465

(22) Filed: Feb. 26, 2018

Related U.S. Application Data

(60) Provisional application No. 62/464,764, filed on Feb. 28, 2017.

(51) Int. Cl.
*G06F 21/60* (2013.01)
*H04L 29/06* (2006.01)
*G06F 21/62* (2013.01)

(52) U.S. Cl.
CPC ...... *G06F 21/6254* (2013.01); *G06F 21/6227* (2013.01)

(58) Field of Classification Search
CPC combination set(s) only.
See application file for complete search history.

(56) References Cited

U.S. PATENT DOCUMENTS

| | | | |
|---|---|---|---|
| 2010/0077006 A1* | 3/2010 | El Emam | G06F 21/6254 707/785 |
| 2015/0128284 A1* | 5/2015 | LaFever | H04L 67/02 726/26 |

* cited by examiner

*Primary Examiner* — Izunna Okeke
(74) *Attorney, Agent, or Firm* — John Maldjian; Maldjian Law Group LLC (57) ABSTRACT

System and method to produce an anonymized electronic data product having an individually-determined threshold of re-identification risk, and adjusting re-identification risk measurement parameters based on individual characteristics such as geographic location, in order to provide an anonymized electronic data product having a sensitivity-based reduced risk of re-identification.

12 Claims, 6 Drawing Sheets

Sensitivity of the data
1. The personal information in the Data is highly detailed
2. The information in the Data is of a highly sensitive or personal nature

Potential injury to patients
1. Many (5000 or more) people would be affected if there was a Data breach or the Data was processed inappropriately by the data requester
2. If there was a Data breach or the Data was processed inappropriately by the data requester, would there be direct and quantifiable damages and measurable injury to the patients

Appropriateness of consent
*These questions are about the original data not the de-identified data.*
1. There is a provision in the relevant legislative authority or a court order to disclose personal health information without the consent of the patients
2. The Data was unsolicited or given freely or voluntarily by the patients with little expectation of it being maintained in total confidence
3. The patients have provided express consent that their Data can be disclosed for this secondary Purpose when it was originally collected or at some point since then
4. The custodian has consulted well-defined groups or communities regarding the disclosure of the Data and had a positive response
5. Was a strategy for informing/notifying the public about potential disclosures for the Data recipient's purpose in place when the Data was collected or any time thereafter
6. If collection without consent is not authorized by law and consent to the disclosure of Data was not previously obtained, is obtaining consent from the data subjects to disclose their Data inappropriate or impractical at this time?

SYSTEM AND METHOD FOR LOCAL THRESHOLDING OF RE-IDENTIFICATION RISK MEASUREMENT AND MITIGATION

CROSS-REFERENCE TO RELATED APPLICATIONS

This application claims the benefit of U.S. Provisional Appl. Ser. No. 62/464,764, filed on Feb. 28, 2017, the entire content of which is hereby incorporated by reference in its entirety.

BACKGROUND

Field

The present disclosure relates to risk assessment of datasets and in particular to reducing re-identification risk of a dataset, with relatively less impact to data quality.

Description of Related Art

Personal information is continuously captured in a multitude of electronic databases. Details about health, financial status, and buying habits are stored in databases managed by public and private sector organizations. These databases contain information about millions of people, which can provide valuable research, epidemiologic, and business insight. For example, examining a drugstore chain's prescriptions can indicate where a flu outbreak is occurring. To extract or maximize the value contained in these databases, data custodians often must provide outside organizations access to their data. In order to protect the privacy of the people whose data is being analyzed, a data custodian will "de-identify" or "anonymize" information before releasing it to a third-party. An important type of de-identification ensures that data is unlikely to be traced to the person about whom it pertains, this protects against "identity disclosure".

When de-identifying records, removing just direct identifiers such as names and addresses is not sufficient to protect the privacy of the persons whose data is being released. The problem of de-identification involves personal details that are not obviously identifying. These personal details, known as quasi-identifiers, include the person's age, sex, postal code, profession, ethnic origin and income, financial transactions, medical procedures, and so forth. De-identification of data requires an assessment of the risk of re-identification.

Once the risk is determined, the risk may be reduced if necessary by mitigation techniques that perturb data, such as generalization, adding noise, suppression, or subsampling. Suppression is a risk mitigation technique that removes a field value from a dataset in order to lower the risk. For example, suppose a re-identification risk of a database is measured. If the measured risk needs to be lowered, suppression may modify a field in the database by replacing actual data in the field with an analytic model of what the data in the field should be. However, if suppression is not done intelligently, the suppression may introduce problems in a returned dataset, and may take a relatively long time to produce a sufficiently anonymized dataset, i.e., a dataset that has been de-identified.

Generalization is a technique where the precision of variable is reduced. For example a year of birth could be generalized to a 5-year interval (e.g., 1978 would become a range 1975-1979). Adding noise draws random noise from a distribution (usually Gaussian) and adds the noise to the original value. This approach changes most values by a fairly limited amount of noise but some values may in fact have a significant amount of noise added. An acceptable risk of re-identification is currently determined by looking at precedents (i.e., what others have done) relative to the sensitivity of the data set as a whole. However, given a set of patients represented in the data set, some patient records may contain a greater amount of sensitive data, while other patient records may contain little to no sensitive data. In the background art, the presence in a data set of some patient records that contain sensitive information would result in a stricter threshold set for the entire data set. In other words, risk of including some patient records with sensitive data will influence an acceptable risk of re-identification for all patients in the data set, leading to increased perturbation and decreased data quality in order to reduce the perceived risk. Particularly in cases where the maximum risk of re-identification must be managed (for example in a public release), this results in more data perturbation than may be necessary for patients whose records do not contain sensitive information.

A drawback of the known methods is that currently they set a single threshold across the entire dataset based on the most conservative threshold across all data subject in a dataset, even when the dataset contains data of heterogeneous sensitivity. If such a threshold results in too much perturbation to the data set, sensitive information may be removed such that higher threshold can be used.

Additional perturbation to the data necessitated by the selection of a lower threshold because of the inclusion of sensitive patients can lead to a dataset that does not have sufficient data utility. For example, in clinical reports required to be made available in an anonymized form for transparency reasons, basing the degree of transformation required for all patients off the lower threshold required for those patients whose data is more sensitive can cause the public to determine that life sciences companies are being overly conservative and not sufficiently transparent.

Excessive or unnecessary perturbation of the data results in poor or reduced data quality about data subject who are less sensitive, because a more restrictive threshold for the entire data set is used. Removal of all sensitive information from datasets before releasing them for secondary use limits the amount of research and learning about sensitive diseases and conditions.

In addition, some patients may have consented to secondary uses of data, which affects the acceptable risk of re-identification. In the background art, the only way to manage the risk of re-identification for those patients separately is to create subsets of the data set. This approach however, creates additional challenges with respect to the calculation of the information associated with various values and prior distributions.

Accordingly, systems and methods that enable improved risk assessment remains highly desirable.

BRIEF SUMMARY

Embodiments in accordance with the present disclosure include a method of risk measurement and mitigation that allows individual data subjects to have individual risk thresholds computed based on a sensitivity of an individual's data and the context of the data. Respective individual risk thresholds define sufficient de-identification or protection for an individual record.

In contrast, in the background art, a threshold is computed globally for a dataset and all individuals are de-identified to the same standard. However, this may compromise data quality, because a small number of sensitive records can make the dataset require a very strict threshold, even though most individuals do not have sensitive records.

Embodiments in accordance with the present disclosure include a system and a method to produce an anonymized cohort, members of the cohort having less than a predetermined risk of re-identification.

Managing an acceptable risk of re-identification for individual patients would allow for the release of higher quality data for patients whose records do not contain sensitive data, while offering additional protection for those with more sensitive data, consistent with patient expectations that more sensitive data is better protected.

Embodiments in accordance with the present disclosure provide a system and method to produce an anonymized electronic data product having a sensitivity-based reduced risk of re-identification, the method including determining a data sensitivity of at least two fields in a data set, determining separate perturbation thresholds for the fields, and applying at least the threshold level of perturbation to the fields, in order to provide an anonymized electronic data product having a sensitivity-based reduced risk of re-identification.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein:

FIG. 6 illustrates a questionnaire to determine sensitivity of data, in accordance with an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary computing and storage system. Although well suited for use with, e.g., a system using a server(s), data sources and/or database(s), the disclosure is not limited to use with any particular type of computing, communication and storage system or configuration of system elements. Those skilled in the art will recognize that the disclosed techniques may be used in any computing, communication and storage application in which it is desirable to store protected data, such as medical data, financial data, educational records data, etc.

As used herein, the term "module" refers generally to a logical sequence or association of steps, processes or components. For example, a software module may include a set of associated routines or subroutines within a computer program. Alternatively, a module may comprise a substantially self-contained hardware device. A module may also include a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing sets of computer code in a processor that performs the function; providing provisionable configuration parameters that control, limit, enable or disable capabilities of the module (e.g., setting a flag, setting permissions, setting threshold levels used at decision points, etc.); providing or removing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; setting a value of an adjustable component (e.g., a tunable resistance or capacitance, etc.), energizing a circuit that performs the function (e.g., providing power to a transceiver circuit in order to receive data); providing the module in a physical size that inherently performs the function (e.g., an RF antenna whose gain and operating frequency range is determined or constrained by the physical size of the RF antenna, etc.), and so forth.

As used herein, the term "transmitter" may generally include any device, circuit, or apparatus capable of transmitting a signal. As used herein, the term "receiver" may generally include any device, circuit, or apparatus capable of receiving a signal. As used herein, the term "transceiver" may generally include any device, circuit, or apparatus capable of transmitting and receiving a signal. As used herein, the term "signal" may include one or more of an electrical signal, a radio signal, an optical signal, an acoustic signal, and so forth.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes a computer readable signal medium such as a propagating signal. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Embodiments are described below, by way of example only, with reference to FIGS. 1-6. The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Certain sensitive personal information like patient health information is protected by law (e.g., Healthcare Information Portability and Accountability Act ("HIPAA," codified at 42 U.S.C. § 300gg and 29 U.S.C. § 1181 et seq. and 42 USC 1320d et seq.) in the U.S.) and must be treated in a way that maintains patient privacy. Such information is termed protected health information (PHI). With respect to PHI, it is important to avoid disclosing the PHI of a specific patient, or to disclose PHI so specific that it discloses an identity of a specific patient. All stakeholders involved must accept their stewardship role for protecting the PHI data contained within. It is essential that systems that access the PHI do so in full compliance with HIPAA and any other applicable laws or regulations of the country concerned, and in a secure manner.

Patient information, including PHI, is sometimes needed for medical studies. For example, observational studies are an important category of study designs. For some kinds of investigative questions (e.g., related to plastic surgery), randomized controlled trials may not always be indicated or ethical to conduct. Instead, observational studies may be the next best method to address these types of questions. Well-designed observational studies may provide results similar to randomized controlled trials, challenging the belief that observational studies are second-rate. Cohort studies and case-control studies are two primary types of observational studies that aid in evaluating associations between diseases and exposures.

Three types of observational studies include cohort studies, case-control studies, and cross-sectional studies. Case-control and cohort studies offer specific advantages by measuring disease occurrence and its association with an exposure by offering a temporal dimension (i.e. prospective or retrospective study design). Cross-sectional studies, also known as prevalence studies, examine the data on disease and exposure at one particular time point. Because the temporal relationship between disease occurrence and exposure cannot be established, cross-sectional studies cannot assess the cause and effect relationship.

Cohort studies may be prospective or retrospective. Retrospective cohort studies are well-suited for timely and inexpensive study design. Retrospective cohort studies, also known as historical cohort studies, are carried out at the present time and look to the past to examine medical events or outcomes. A cohort of subjects, selected based on exposure status, is chosen at the present time, and outcome data (i.e. disease status, event status), which was measured in the past, are reconstructed for analysis. An advantage of the retrospective study design analysis is the immediate access to the data. The study design is comparatively less costly and shorter than prospective cohort studies. However, disadvantages of retrospective study design include limited control the investigator has over data collection. The existing data may be incomplete, inaccurate, or inconsistently measured between subjects, for example, by not being uniformly recorded for all subjects.

Some medical studies, such as retrospective cohort studies, may involve authorized access by medical researchers to anonymized PHI, i.e., to PHI that ideally is not identifiable with the original patient. However, in practice there is nonzero risk that the anonymized data may be re-identified back to the original patient, for example, if data selection criteria is excessively narrow, thus risking that a very small pool of patients meet the selection criteria.

Databases or datasets generated therefrom that contain personally identifiable information such as those used in medical and financial information can include a cross-sectional data (L1) in addition to longitudinal data (L2). Cross-sectional data includes a single record for each subject. A dataset is longitudinal if it contains multiple records related to each subject and the number of records may vary subject to subject. For example, part of a longitudinal dataset could contain specific patients and their medical results over a period of years. Each patient may have varying times and number of visits. In general a patient will only have a single gender, birthday, or ethnicity, which is consistent throughout his/her life. Longitudinal data are those values which exist an unknown number of times per patient. A patient may receive only a single diagnosis, or may be diagnosed with multiple different diseases. Some patients may not have any values for some longitudinal quasi-identifiers (QIs). An L2 group refers generically to a set of values drawn from one or more longitudinal tables which can be relationally linked together. A dataset may have more than one L2 group which cannot be inter-connected. In medical databases a patient can have multiple events based upon for example diagnoses, procedures, or medical visits defining L2 data.

Such datasets are valuable in research and analytics, however the use of the datasets can provide an opportunity for attackers to determine personally identifiable information resulting in a data breach.

Traditionally, if a risk of re-identification for a dataset is estimated to be too high (compared to a predetermined threshold), the risk is reduced by the use of one or more of several techniques to perturb the data, such as suppressing entire records, suppressing values from records, generalizing values to a more granular value (e.g., a wider age band), and so forth. However, these techniques necessarily degrade the returned data, with resulting effects on any findings based upon the degraded returned data.

Figure 1:
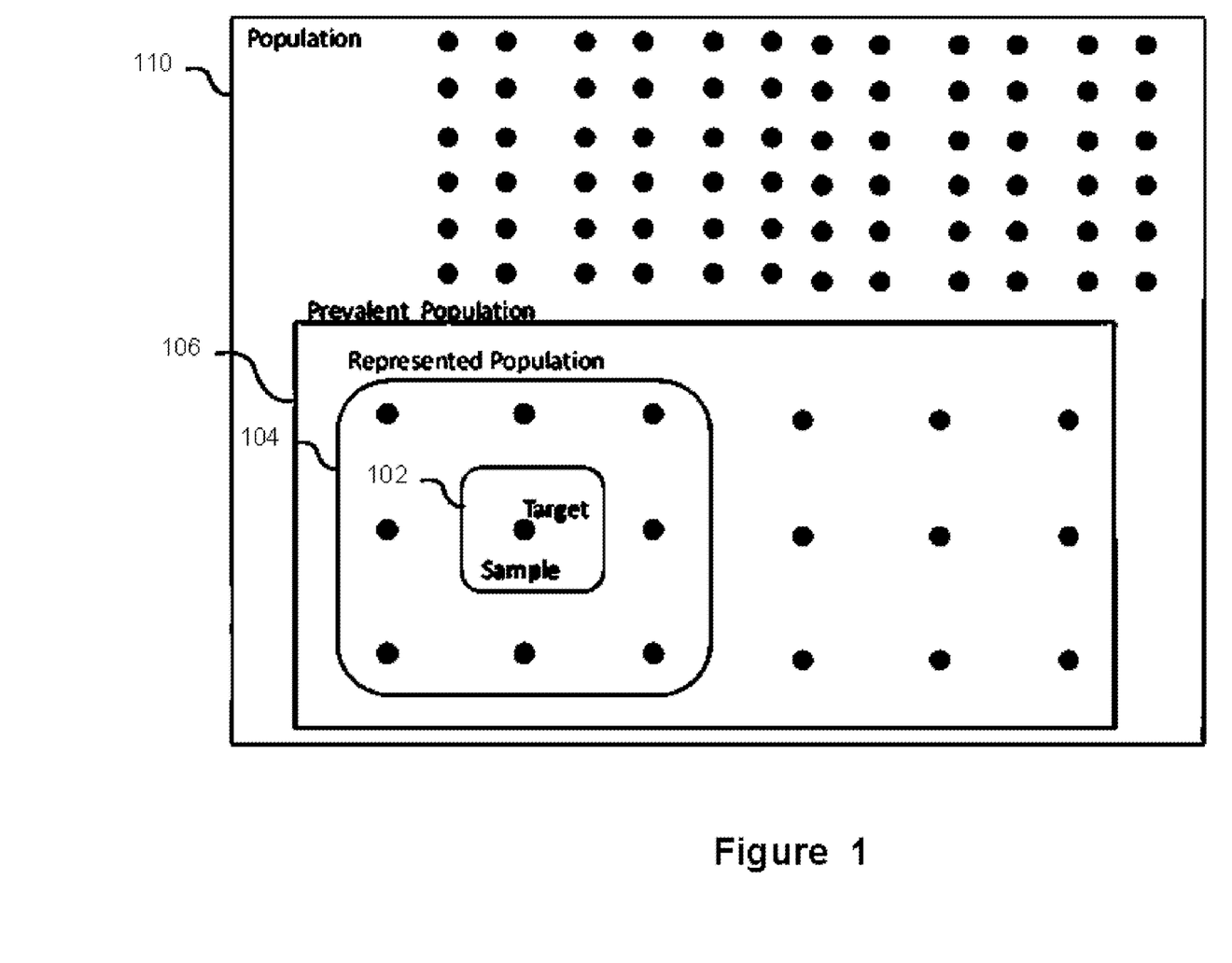
FIG. 1 shows a representation of a sample population in accordance with an embodiment of the present disclosure.

Exemplary populations 110, 106, 104 and a sample 102 are described in relation to FIG. 1. The sample 102 in this case contains one person, the target. Sample 102 represents nine people 104 in the represented population 104, i.e. the target looks like eight other people in the represented population 104.

The sample 102 contains a randomly selected person from the prevalent population 106. This is the group of people who could be in the dataset. i.e., if the dataset is about cancer, then the prevalent population 106 is all people who have cancer. In this example the prevalence is 1/5, or 18 people have breast cancer and could be in the dataset. This group of 18 people will be called the prevalent population 106 to indicate the relationship to disease and that population size*prevalence=prevalent population size.

The sample 102 is a subset of the prevalent population 106, one patient in this case, and the one patient looks similar only to half of prevalent population 106. Thus, k=1, K=9, and N=18, where N is the prevalent population size.

The population 110 contains everyone, even people who do not have cancer. The sampling fraction is defined as the ratio between the sample 102 and the prevalent population 106. The represented fraction is defined as the ratio between the sample 102 and the represented population 104. From this point on, the prevalent population 106 will be referred to as the population.

In embodiments, Quasi-Identifiers (QIs) are sub-divided into categories based on the largest (i.e., most general) group of people who can know a piece of information, either public information or acquaintance information.

Public information: This information (i.e., data) is either publically available or the recipient has this data. Public data should be structured, accessible to the recipient, and cover a large portion of the population, such as 1% or greater. A good test for public knowledge is "could the recipient look up this value for a large percentage of randomly selected people." While self-disclosure online and reports in newspapers are public knowledge, they are not structured and do not cover a large part of the population.

Acquaintance information: This is information about one person (i.e., the subject) that may be known by a second person (i.e., the acquaintance) if the acquaintance is familiar with the subject, or if the acquaintance sees the subject. Acquaintance level knowledge also includes information on celebrities and public figures that have their personal lives disclosed.

Acquaintance knowledge is not required to be structured or centralized, however it should be knowable by many acquaintances. A good test is "Would at least 50% of your acquaintances know this value?"

Figure 2:
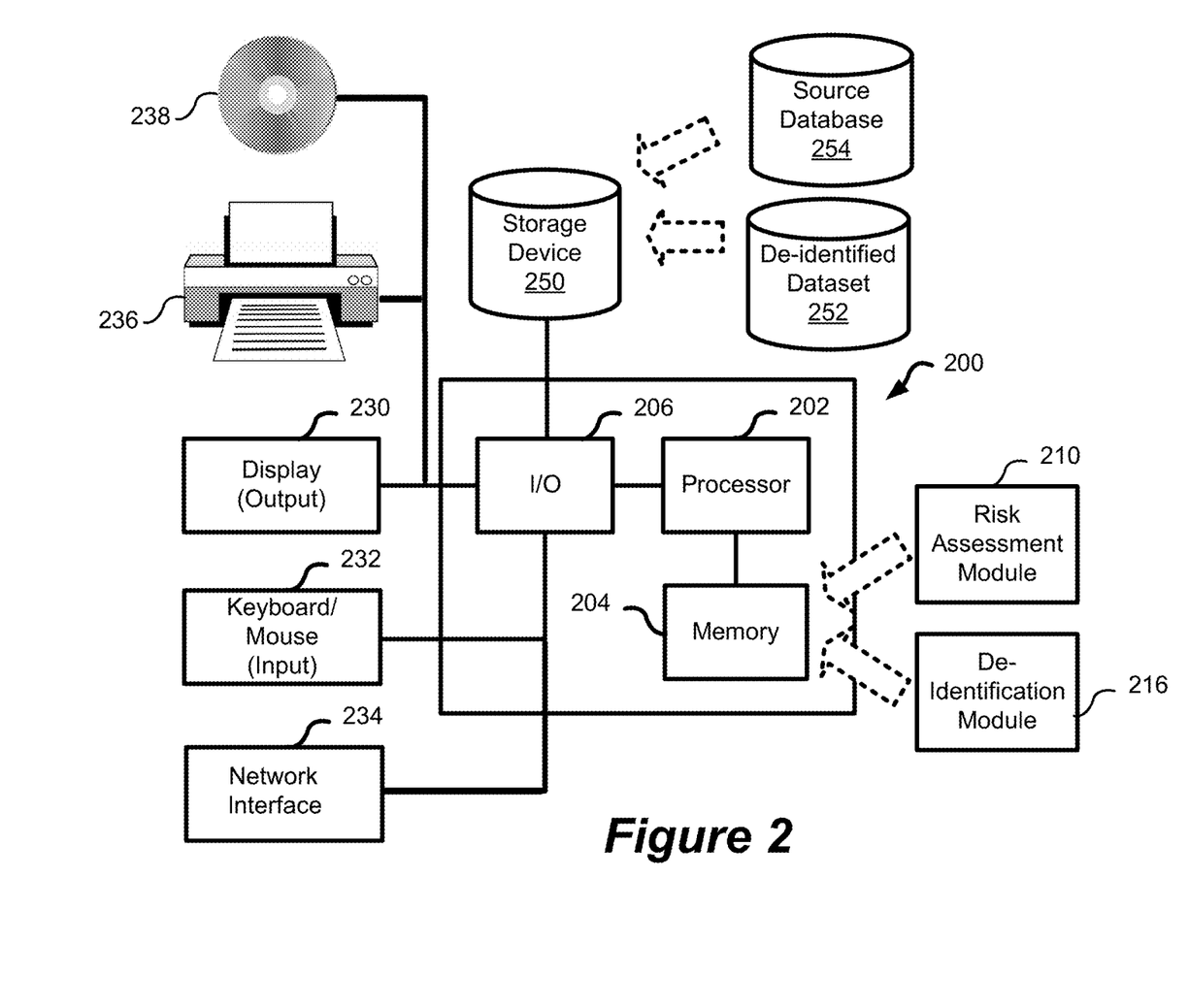
FIG. 2 shows a representation of system for determining re-identification risk of dataset in accordance with an embodiment of the present disclosure.

FIG. 2 shows a system 200 for performing risk assessment of a dataset, in accordance with an embodiment of the present disclosure. System 200 executes on a computer including a processor 202, memory 204, and input/output interface 206. Memory 204 executes instruction for providing a risk assessment module 210, which performs an assessment of re-identification risk. The risk assessment may also include a de-identification module 216 for performing further de-identification of the database or dataset based upon the assessed risk. A storage device 250, either connected directly to the system 200 or accessed through a network (not shown) stores the de-identified dataset 252 and possibly the source database 254 (from which the dataset is derived) if de-identification is being performed by the system. Storage device 250, de-identified dataset 252, and/or source database 254 may be located remotely from other portions of system 200, and may represent distributed storage, cloud storage, or the like. A display device 230 allows the user to access data and execute the risk assessment process. Input devices such as keyboard and/or mouse provide user input to the I/O module 206. The user input enables selection of desired parameters utilized in performing risk assessment, but may also be selected remotely through a web-based interface via network interface 234. The instructions for performing the risk assessment may be provided on a computer readable memory. The computer readable memory may be external or internal to the system 200 and provided by any type of memory such as read-only memory (ROM) or random access memory (RAM). System 200 further may include a printer 236 to create a tangible hardcopy printed output of de-identified data sets created according to methods disclosed herein, and an interface 238 to save in tangible and non-volatile electronic form a de-identified data sets created according to methods disclosed herein. The non-volatile electronic form may include, e.g., an optical drive, a tape drive, a removable magnetic platter, a flash drive, a hard disk, a solid state drive, etc. The risk assessment process can determine a risk for population to sample and sample to population type attacks in order to aid in determining quasi-identifier de-identification or anonymization strategies to be applied to the dataset.

Standard de-identification techniques known in the art include generalization, suppression, and subsampling. Suppression is a targeted technique that removes individual values from a dataset in order to lower the risk to an appropriate level. The values chosen should be in line with the risk measurement approach in order to maximize the impact of each suppression event.

The background art computes a single threshold for all records in a dataset. If the dataset has individuals with varying degrees of sensitivity, then there were only two approaches in the background art to manage risk of re-identification on the dataset:

1. Use a lower threshold for the whole data set (i.e., a Global Threshold) because the data is sensitive; and
2. Remove sensitive information, by either removing the sensitive individuals, or by removing records containing sensitive information.

Embodiments in accordance with the present disclosure are highly useful in a maximum risk scenario (e.g., a public release), and also useful for an average risk scenario (e.g., a private release). Table 1 below compares the impact of embodiments compared to the background art for a maximum risk scenario.

TABLE 1

|  | Sensitive Record | Non-sensitive records |
| --- | --- | --- |
| Lower Global Threshold (background art) | Significant perturbation (Some data retained) | Significant perturbation (Some data retained) |
| Remove Sensitive Information (background art) | Removed | Minimal perturbation (much of the data retained) |
| Local Threshold (Embodiment in accordance with the present disclosure) | Significant perturbation (Some data retained) | Minimal perturbation (much of the data retained) |

As described in Table 1, local thresholding in accordance with embodiments of the present disclosure includes benefits of previous approaches in the background art: embodiments minimally perturb non-sensitive records and/or individual record inclusion, while retaining but significantly perturbing sensitive records and/or data subjects. Note that the threshold does not actually proscribe an amount of data perturbation on any given individual. Rather, the threshold determines how anonymous the records should be when they are rendered. The actual amount of perturbation is a function of both the total information originally present related to that patient and the threshold that must be reached. The comparisons in Table 1 assume patients with equivalent amounts of information, but different levels of sensitivity.

By using local thresholding, embodiments retain sensitive information that may be relevant to an analysis (e.g., to a drug effect analysis). Embodiments may set a separate threshold for different patients in a data set, down to a separate threshold for substantially each patient in the data set, and thereby minimally perturb data of patients who do not have sensitive information while affording greater protections to those patients who do have sensitive information. The threshold may be considered to be a function of the sensitivity. Although the function may be a mathematical function (e.g., a linear function) if both the sensitivity and threshold are expressed numerically, the function may also represent simply a positive correlation of threshold with the sensitivity, e.g., greater sensitivity requires a greater threshold level of perturbation.

Further benefits of embodiments include that analysis of data sensitivity is more automated and requires less human effort. Local thresholding does not require removal of sensitive record, yet it can improve on the data quality of sensitive records.

Embodiments provide further advantages in a data streaming in environment. Initially, in such an environment, there may not exist a dataset of significant size. It may not be reasonable to establish the expected sensitivity of the dataset before it has been collected, otherwise an overly conservative risk threshold would be required. However, the embodiments allow for the risk threshold to be adaptive on a patient-by-patient basis as data about patients arrives and is processed.

Embodiments in accordance with the present disclosure provide a process to perturb data minimally, while providing a re-identification risk less than a predetermined threshold. The process proceeds first by receiving data about a patient. Receiving data may include retrieving additional data from an existing database and combining the additional data with the received data.

Second, the process determines an appropriate threshold for each patient. The determination may include an automated analysis of the patient for codes that are related or correlated (in a statistical sense) with a sensitive diagnosis or condition. Drug codes, diagnosis codes, locations, and the like should be considered. Determination of the threshold may also consider the age and region in which the data subject lives (e.g., country or state), since there may be laws or governance that relate to the threshold, specific to the region. For example, information pertaining to children is often considered sensitive. Different countries have different governance related to de-identification that must be considered.

Third, the process determines a risk mitigation strategy that leads to the risk of re-identification being below the risk threshold. Determining the risk mitigation strategy may be an iterative process, including sub-steps of proposing a solution, calculating an updated local threshold, calculating the risk, and repeating if the calculated risk exceeds the local threshold. Numerous iterations may be required to process a single patient. For a data set of a million or billion patients, the only feasible approach to determine a threshold per patient and de-identification strategy per patient is an automated (i.e., computational) approach.

Fourth, patient information is de-identified in accordance with the risk mitigation strategy.

Embodiments in accordance with the present disclosure are appropriate for substantially any application related to de-identification. In the context of clinical trial transparency services (e.g., for public releases under "European Medicines Agency policy on publication of clinical data for medicinal products for human use", known as "Policy/0070"), embodiments may allow clients to follow a regulator's threshold for patients whose data is not particularly sensitive, while enforcing a stronger threshold for data that is more sensitive. This would permit embodiments to handle sensitive data differently while maximizing a chance of acceptance by regulators of a more conservative threshold, because the more conservative threshold is applied only on an as-needed basis.

Processes in the background art to minimize a maximum risk measurement include quantifying contextual factors, and determining a global threshold for a dataset based on the overall sensitivity of the data. Then for each data subject, measure the risk of re-identification on the data subject, verify that each data subject risk is below the global threshold, and aggregating the data subject risk value to a dataset risk value. The background art would then determine if the dataset is sufficiently low risk.

Figure 3:
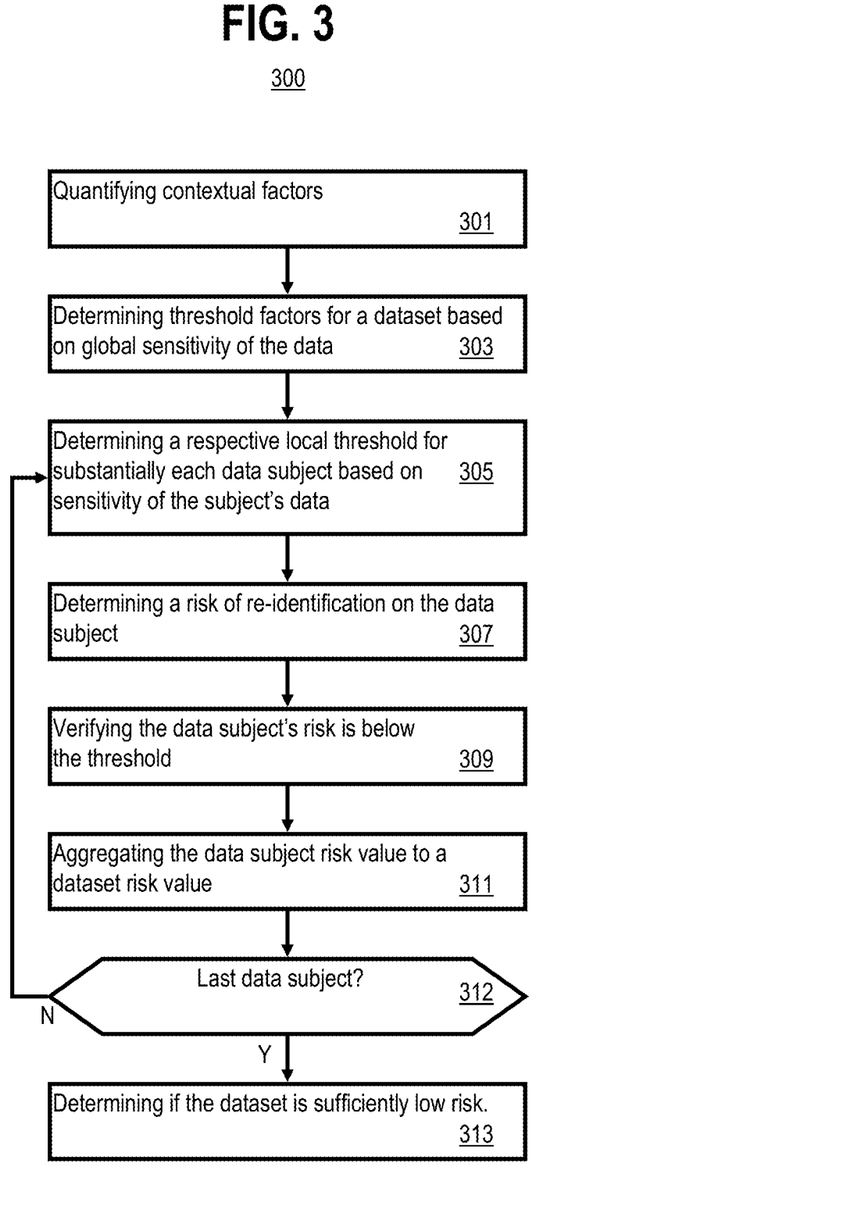
FIG. 3 illustrates a process of maximum risk measurement with local thresholding, in accordance with an embodiment of the present disclosure.

In contrast, FIG. 3 illustrates a process 300 of maximum risk measurement with local thresholding, in accordance with an embodiment of the present disclosure. Process 300 begins at step 301, at which contextual factors are quantified. Next, process 300 transitions to step 303, at which threshold factors are determined for a dataset based on global sensitivity of the data. This step may include and capture global factors that contribute to the threshold, such as the dataset size. These global factors may help determine an upper bound on the local thresholds to be calculated below.

Process 300 then transitions to step 305, at which a respective local threshold is determined for substantially each data subject based on sensitivity of the subject's data. Next, process 300 transitions to step 307, at which a risk of re-identification on the data subject is measured or otherwise determined. Next, process 300 transitions to step 309, at which the data subject's risk is verified to be below the threshold. Next, process 300 transitions to step 311, at which the data subject risk value to a dataset risk value is aggregated. Steps 305-311 are repeated for each data subject by use of decisional step 312.

Next, process 300 transitions to step 313, at which embodiments determine if the dataset is sufficiently low risk.

In an average risk measurement scenario, each data subject is not required to be low risk. Instead, only an average re-identification risk across data subjects must be low risk. Thus, some embodiments may "normalize" a data subject risk based on local threshold, so that each data subject is compared to local threshold. However, when risk values are aggregated they have comparable units (i.e., can be compared against the same value), in order to achieve a similar behavior to embodiments of maximum risk local thresholding. For example, (Data subject Risk <=Threshold) may be expressed as (Data subject Risk/Threshold <=1.0), which normalizes risk with a local threshold so embodiments may compare calculated risk against a risk threshold value.

In some embodiments, substantially each data subject may have a custom threshold, but embodiments may compare datasets using a constant value for comparison. For example, a constant of 1.0 may be used.

Processes in the background art to minimize an average risk measurement include quantifying contextual factors, and determining a global threshold for a dataset based on sensitivity of the data. Then for each data subject, measuring a risk of re-identification on the data subject, and aggregating data subject risk values to a dataset risk value (including data subject risk in the average). Finally, determining if the average risk for the dataset is below the global threshold.

Figure 4:
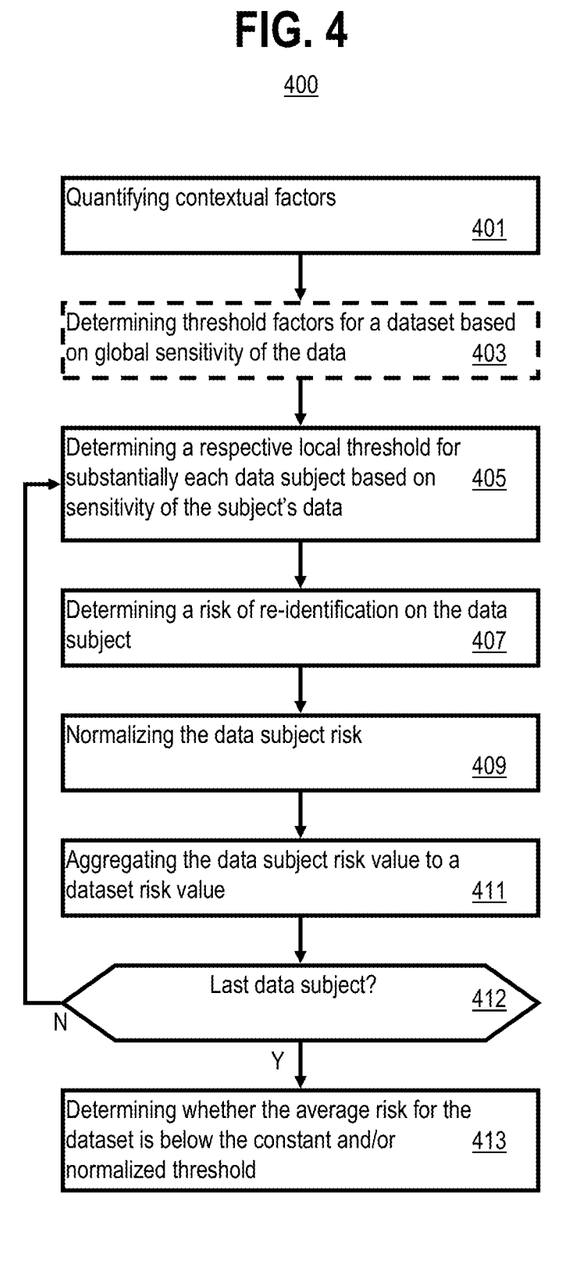
FIG. 4 illustrates a process of average risk measurement with local thresholding, in accordance with an embodiment of the present disclosure.

In contrast, FIG. 4 illustrates a process 400 of average risk measurement with local thresholding, in accordance with an embodiment of the present disclosure. Process 400 begins at step 401, at which contextual factors are quantified. Next, process 400 transitions to optional step 403, at which threshold factors are determined for a dataset based on global sensitivity of the data. This step may include and capture global factors that contribute to the threshold, such as the dataset size. These global factors may help determine an upper bound on the local thresholds.

Process 400 then transitions to step 405, at which a respective local threshold is determined for substantially each data subject based on sensitivity of the subject's data. Next, process 400 transitions to step 407, at which a risk of re-identification on the data subject is measured or otherwise determined. Next, process 400 transitions to step 409, at which the data subject risk is normalized. Next, process 400 transitions to step 411, at which the data subject risk value is aggregated to a dataset risk value (including data subject risk in the in the average). Steps 405-411 are repeated for each data subject by use of decisional step 412.

Finally, process 400 transitions to step 413, at which it is determined whether the average risk for the dataset is below the constant and/or normalized threshold. In this way, process 400 computes a threshold per data subject, while also normalizing the risk.

In some embodiments, there is another way to implement local thresholding for an average risk measurement. In this embodiment, at least some data subjects may be grouped with the same local threshold. This would effectively create several datasets, each of which includes patients with the same threshold. Embodiments then may apply the original average risk measurement process to each dataset. The goal would be for each dataset to have an average risk below its threshold. This process is better suited for smaller datasets. However, if one of the datasets is very small (e.g., containing only one data subject), the requirement that data subjects have a risk measurement below the threshold may cause loss of the benefits of averaging.

Figure 5:
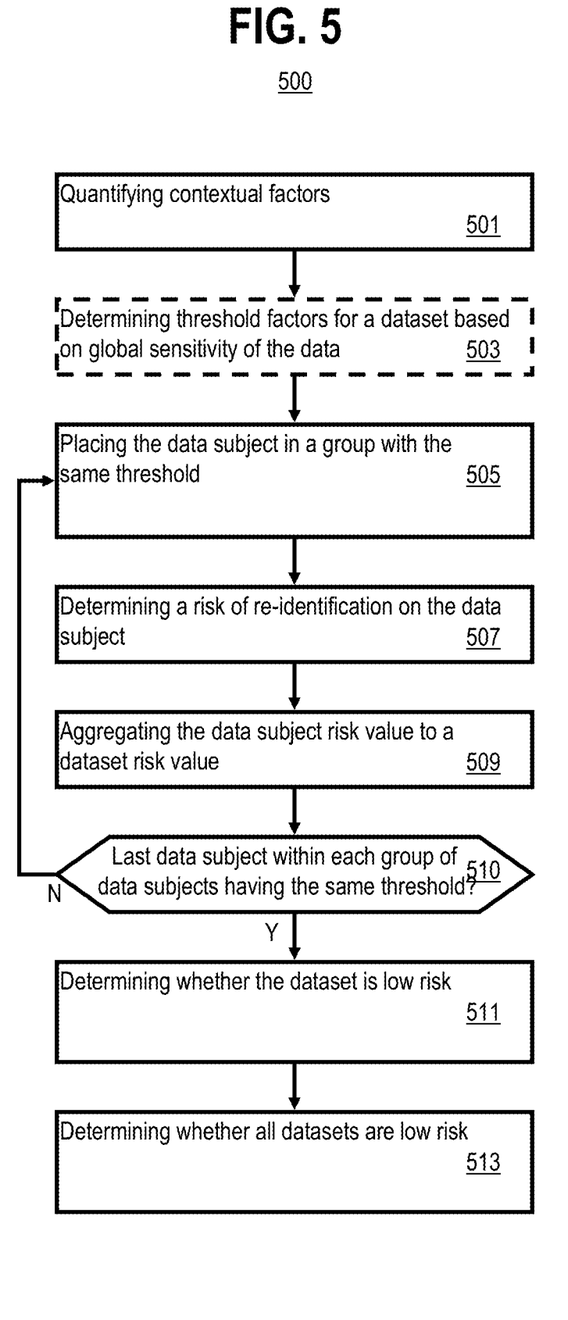
FIG. 5 illustrates a process 500 in accordance with an embodiment of the present disclosure.

FIG. 5 illustrates a process 500 in accordance with an embodiment of the present disclosure. Process 500 begins at step 501, at which contextual factors are quantified. Next, process 500 transitions to optional step 503, at which a respective threshold for the data subject is determined based on sensitivity of the data subject's data. Next, process 500 transitions to step 505, at which the data subject is placed in a group with the same threshold (i.e., sharing a common threshold). Steps 503 and 505 may be repeated for substantially each data subject.

Next, process 500 transitions to step 507, at which the risk of re-identification on the data subject is determined or measured. Next, process 500 transitions to step 509, at which the data subject risk value to a dataset risk value is aggregated (including data subject risk in the in the average). Steps 507 and 509 may be repeated by use of decisional step 510 for substantially each data subject within each group of data subjects having the same threshold.

Next, process 500 transitions to step 511, at which it is determined whether the dataset is low risk. Next, process 500 transitions to step 513, at which it is determined whether all datasets are low risk.

FIG. 6 illustrates a questionnaire 600 to determine sensitivity of data, in accordance with an embodiment of the present disclosure. The sensitivity of data as determined at least in part by the questionnaire may be useful to determine local thresholds for the data.

The questionnaire of FIG. 6 is exemplary, and other useful questionnaires may have more or fewer questions, or different types of questions, or questions worded differently, or questions presented in a different order or in a different grouping, or optional questions that may be presented depending upon answers to other questions, and so forth. The set of questions may change over time, e.g., to remove bias, ambiguity, or otherwise improve the questions.

A scoring matrix may be applied to the answers from questionnaire 600 to determine a threshold for sensitivity. Local thresholding may determine automatically answers to what is the sensitivity of the data by examining the quantity, types, and values related to each patient. An automated analysis of the information related to data subject may identify values that indicate or are correlated with a sensitive diagnosis and/or condition. For example, sensitive diagnoses and/or conditions may include drug codes (e.g., HIV drugs), ICD9 codes (e.g., HIV, mental illnesses), locations (e.g., prisons, addiction recovery centers), and so forth.

Any of the values in the questionnaire may be encoded in the dataset and may be used locally to adjust the threshold. However, it is unlikely that a number of these questions will be found encoded in the data. Thus, a reasonable implementation of local thresholding will allow a user to enter answers to each of the questions, or indicate which column in the database encodes the answer to the question for each individual, or even detect consent in unstructured text. Furthermore, a default answer may be encoded by the user in case the individual value is not present (i.e., if an entry in a table and/or column does not contain a value for a patient, or the listed value is a non-data code such as NULL).

Local thresholding may be extended in a variety of ways. In some embodiments, a condition required to achieve low risk is given by the relationship of Equation (1):

$$(\text{Data Risk}) \times (\text{Content Risk}) \leq \text{Threshold} \qquad (1)$$

Different embodiments of local thresholding affect different terms of Equation (1). Local thresholding involves moving a parameter (i.e., a threshold), which historically has been considered at a dataset level of granularity, down to a patient level of granularity. The same concept of moving an aspect of risk measurement from one level of granularity to another level can be applied to other aspects of risk measurement that traditionally have been considered at the dataset level.

Other embodiments of local thresholding and interactions with a system may depend upon sensitivity of the threshold of Equation (1) to changes of an input. The presence or absence of sensitive information in a patient's profile may affect a degree of privacy that can be expected. Currently, privacy is considered at a dataset level, e.g., by determining a baseline degree of sensitivity for a dataset. The degree of sensitivity may be a qualitative assessment, with guidance based on past precedents of previous data releases. Conversely, a more quantitative approach may be used by determining a maximum sensitivity (e.g., what is the most sensitive value in the dataset), or from an average sensitivity (e.g., what is the expected sensitivity of a randomly selected patient).

In other embodiments, the sensitivity results from local thresholding may depend upon regional inputs, such as cultural norms, considerations, or legal requirements. For example, embodiments may calculate a threshold based on a data sensitivity assessment questionnaire, which returns a result based on past precedents (e.g., historic data releases) primarily in North America. Additional results may be determined for other regions based on precedents or legal requirements in those jurisdictions. While the background art may apply such considerations to a global threshold, the identification of the country of a patient in their record may be used to establish a risk threshold appropriate for that patient. This may apply to clinical trial datasets that involve patients from many different countries that have differing privacy expectations (e.g., the United States vs. United Kingdom vs. Germany vs. South Korea).

In addition, values considered to be sensitive vary from region to region based upon societal norms and legal requirements. For example, mental illness may be considered sensitive and potentially stigmatizing information in some areas, but be more accepted elsewhere. Race is considered to be a sensitive value in the Netherlands, but is public information on some voter registration lists in the United States of America.

In some embodiments, patient consent to make their data accessible will affect the threshold of Equation (1). In particular, some people will consent to their data being reused for secondary purposes, especially when they see a greater good (i.e., a societal benefit) resulting from this sharing. However, limiting a dataset to only those individuals who consent to their data being used can introduce bias. Patients who have not consented to having their data shared have a greater expectation of privacy, compared to patients who have expressly consented to data sharing. By including a field or text to indicate consent status, local thresholds for each patient can be adjusted to take into account the consent status.

Whether or not consent has been given may be handled as a question within the data sensitivity assessment questionnaire, and the indication of patient consent saved with the patient data. Presently, if not all patients have given consent, then a lower threshold may be applied globally. To use a higher threshold (and therefore higher data quality) from patients who have given consent, those patients who have not consented would need to be excluded from the dataset.

In some embodiments, localized classification of quasi-identifiers will affect the data risk of Equation (1). For example, there are two directions of attack: population to dataset and dataset to population. The differentiation of attack directions is referred to as a "PAF Model".

In a dataset to population attack, an adversary chooses a target person within the dataset and attempts to locate that person in the wider population, typically by linking and comparing against a registry such a voter registration list. The registry contains quasi-identifier (QI) information (referred to as "public quasi-identifiers") that can be used in the dataset to population attack, even if the attack is limited just to QI values in the registry.

In a population to dataset attack, an adversary chooses a target person from the general population and attempts to locate the target person in a dataset. The adversary has a richer pool of quasi-identifiers to draw from in an attempt to re-identify the target. However, there is a chance that the target may not be in the dataset if the dataset is not a registry. The richer pool of quasi-identifiers may be referred to as "acquaintance quasi-identifiers". An acquaintance QI is not limited to information known by an actual acquaintance of a target (i.e., someone personally known by the target), but rather includes information that may be obtained from other interactions (e.g., seeing the target on the street for a visible diagnosis, descriptions in news articles of celebrities, self-disclosed values or conditions on social media or forums, etc.).

A difference between a public QI and acquaintance QI is the presence or absence, respectively, of a structured dataset that covers a significant portion of a prevalent population that can be linked against for a linking attack. However, the presence or absence of fields in such a dataset can vary by geographic location or by a sub-population of a wider population. Even voter registration lists in the United States (as a prototypical example of linkage attacks) vary from state to state. By identifying the types of quasi-identifiers and the location of the patient, the classification of those quasi-identifiers as public or acquaintance may be automated on a per-patient basis.

Similarly, a more detailed registry may be available for patients who fall into a specific subset of the population. If there is a registry of all people diagnosed with a certain disease (e.g., kidney disease and an associated kidney transplant list), the quasi-identifiers which appear in this registry should be considered to be "public" in the dataset being de-identified. If a patient could fall into several different sub-populations, the public quasi-identifiers for this patient is the union of the public quasi-identifiers indicated by each sub-population.

In some embodiments, the threshold of Equation (1) may be adjusted based upon streamed data. For example, presently the threshold for a dataset has to be determined both globally and up front. If the dataset exists in a single state and this is what will be de-identified and shared, then there is a single source of truth for each patient's sensitivity. However, if the dataset streams and more information is added over time, then a person's sensitivity (or other data fields) may change over time.

In some embodiments, a local buffer may be used to help accommodate future releases of information by a patient (e.g., a patient who is undergoing continuing treatment). For example, if it is known that additional information will be released about a patient at a later point in time, then a buffer for that patient may be allocated in a database in order to account for additional details, or to account for the risk of leaking information in unstructured text. In some embodiments, this buffer may be applied on a per-patient basis, such as only being applied to those patients to have experienced an adverse event to a new medication because those patients will appear in a narrative in the clinical report. In contrast, most of the rest of the population will not have a narrative and thus would not need a local buffer.

In some embodiments, a context of Equation (1) may be applied locally. For example, when data recipients are able to query a de-identified dataset in an environment that is monitored by a data custodian, then different controls can be applied based on value in each individual record. For example of a control, the system may prevent a user from downloading records of children, but allow it for adult records. A query engine may automatically disable a user's account if the query engine determines the user is attempting to perform improper actions (e.g., overlapping queries that circumvent a minimum cell size count in aggregate results). This automatic disabling decreases the usability of the system, so automatic disabling may be invoked only when improper actions are detected with respect to a sensitive subset of the population (e.g., children's records, or when the results involve people with a sensitive diagnosis). Therefore, the higher security context would only apply to a subset of records.

In some embodiments, all users may be permitted access to most of the dataset, but records pertaining to a subset of the population may be restricted, e.g., by imposing stronger controls on users wishing to access the subset, or by limiting access to users having a higher level of trust. In either case, the restrictions create a separate context risk to different patients in the dataset. This can be used to offset an increased threshold applicable to these patients. Without a local context adjustment, a worst-case scenario may be applied, e.g., a lower threshold based on sensitive information and a higher context risk based on the most-permissive controls.

In some embodiments, a localized choice of a population may be used. For example, suppose a dataset includes a common prevalent population, representing persons who could be in the data set. Patient re-identification risk of Equation (1) is computed relative to this prevalent population. In particular, when an information theory-based approach is used, embodiments determine a number of bits required to re-identify a patient based on size of the prevalent population. When a comparison-based approach is used, size of the prevalent population is used to estimate a size of an equivalence class in the population based on its size in the data set.

In either approach, characteristics of both the data set and the range or width of the set of quasi-identifiers for the patients it contains may be used to choose a prevalent population. Some approaches use a global setting, typically the widest range that would be applicable for all patients, but greater localization (i.e., a more localized computation) may be used. For example, consider a clinical trial where there are multiple branches to the trial, and one branch is restricted to elderly trial participants while other branches are open to any adult. A localized population will allow for the correct re-identification risk measurement for both branches in a single risk measurement. Such localization may provide benefits similar to local adjustment of a re-identification risk threshold, because it reduces a need to make conservative estimates of a prevalent population such that some patients are members of a smaller prevalent population than other patients.

Embodiments in accordance with the present disclosure may produce, as an electronic data product, a data set having a reduced risk of re-identification and relatively less impact to data quality, compared to re-identification processes of the known art. In some embodiments, the electronic data product may be produced in a tangible form. For example, the tangible form may take the form of a non-volatile computer storage medium to store the electronic data product, as written by disk drive interface 238. The storage medium may be either removable (e.g., optical disk drive) or one that is ordinarily not intended to be removable in normal operation (e.g., an internal hard disk drive). The tangible form also may take the form of a printed report created by, e.g., printer 236.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIG. 2 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Embodiments of the present disclosure include a system having one or more processing units coupled to one or more memories. The one or more memories may be configured to store software that, when executed by the one or more processing unit, allows practice of the embodiments described herein, at least by use of processes described herein, including at least in FIGS. 3-5, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present disclosure may be dependent on various considerations, such as the speed or efficiency requirements of the system, the particular function, and the particular software or hardware systems being utilized.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

We claim:

1. A system for local thresholding of re-identification risk, the system comprising:
    a processor configured to:
        quantify, based on variable security controls, contextual factors of the re-identification risk for different datasets comprising data representing each of a plurality of individuals, each individual having a plurality of fields;
        for each individual in each dataset:
            determine, based on sensitivity of the data and the threshold factors,
                a local threshold of the re-identification risk specific to each individual,
                a re-identification risk value of each individual, and
                that the re-identification risk value is below the respective local threshold;
            aggregate the re-identification risk value of plurality of individuals in the dataset, wherein the local threshold and re-identification risks are normalized across the plurality of individuals;
            revise the local threshold based on respective data perturbation for the individual; and
            place the individuals in one of a plurality of groups in accordance with the respective local threshold.

2. The computing system of claim 1, wherein the processor is further configured to determine the sensitivity is using a questionnaire-based scoring matrix.

3. The computing system of claim 2, wherein the sensitivity is specific to a region of the individual.

4. The computing system of claim 1, wherein a classification of the plurality of fields depends upon inputs of the plurality of individuals.

5. The computing system of claim 1, wherein the processor is further configured to determine the threshold factors for the dataset based on global sensitivity of the data.

6. The computing system of claim 1, wherein the re-identification risk for each individual is based on a locally-computed regional inputs of the plurality of individuals.

7. A method for local thresholding of re-identification, the method comprising:
    quantify, based on variable security controls, contextual factors of the re-identification risk for different datasets comprising data representing each of a plurality of individuals, each individual having a plurality of fields;
    for each individual in each dataset:
        determining, based on sensitivity of the data and the threshold factors,
            a local threshold of the re-identification risk specific to each individual,
            a re-identification risk value of each individual, and
            that the re-identification risk value is below the respective local threshold;
        aggregating the re-identification risk value of plurality of individuals in the dataset, wherein the local threshold and re-identification risks are normalized across the plurality of individuals:
        revising the local threshold based upon respective data perturbation for the individual; and
        placing the individuals in one of a plurality of groups in accordance with the respective local threshold.

8. The method of claim 7, further comprising a step of determining the sensitivity using a questionnaire-based scoring matrix.

9. The method of claim 7, wherein the sensitivity is specific to a region of the individual.

10. The method of claim 7, wherein a classification of the plurality of fields depends upon inputs of the individuals.

11. The method of claim 7, further comprising a step of determining the threshold factors for the dataset based on global sensitivity of the data.

12. The method of claim 7, wherein the re-identification risk for each individual is based on a locally-computed regional inputs of the plurality of individuals.

* * * * *